(12) United States Patent
Shin et al.

(10) Patent No.: US 9,681,368 B2
(45) Date of Patent: Jun. 13, 2017

(54) APPARATUS AND METHOD FOR DISPLAYING SERVICE INFORMATION PROVIDED IN SERVICE ZONE

(75) Inventors: Kangsoo Shin, Seoul (KR); Dukho Choi, Seoul (KR); Yunji Koh, Seoul (KR); Jinsung Im, Seoul (KR)

(73) Assignee: LG Electronics Inc., Seoul (KR)

( * ) Notice: Subject to any disclaimer, the term of this patent is extended or adjusted under 35 U.S.C. 154(b) by 1301 days.

(21) Appl. No.: 13/146,879

(22) PCT Filed: Jul. 30, 2010

(86) PCT No.: PCT/KR2010/005051
§ 371 (c)(1),
(2), (4) Date: Jul. 28, 2011

(87) PCT Pub. No.: WO2012/015091
PCT Pub. Date: Feb. 2, 2012

(65) Prior Publication Data
US 2012/0029808 A1 Feb. 2, 2012

(51) Int. Cl.
*H04W 48/18* (2009.01)
*H04W 48/20* (2009.01)
*G01C 21/20* (2006.01)
*H04W 4/00* (2009.01)

(52) U.S. Cl.
CPC ............ *H04W 48/18* (2013.01); *G01C 21/20* (2013.01); *H04W 4/00* (2013.01); *H04W 4/001* (2013.01); *H04W 48/20* (2013.01)

(58) Field of Classification Search
CPC .................................................. H04W 48/18
See application file for complete search history.

(56) References Cited

U.S. PATENT DOCUMENTS 7,983,612 B2 * 7/2011 Nelson ................. H04M 1/22
455/3.06
8,223,662 B2 * 7/2012 Deshpande et al. .......... 370/252
(Continued)

FOREIGN PATENT DOCUMENTS

KR 10-2002-0006357 A 1/2002
KR 10-0692635 B1 3/2007
KR 10-0810881 B1 2/2008

OTHER PUBLICATIONS

"UI Patterns and Techniques: Progress Indicator," Time-tripper.com [archive] [available: https://web.archive.org/web/20051104110220/http://time-tripper.com/uipatterns/Progress_indicator].*

*Primary Examiner* — Thomas G Black
*Assistant Examiner* — Peter D Nolan
(74) *Attorney, Agent, or Firm* — Birch, Stewart, Kolasch & Birch, LLP (57) ABSTRACT

A terminal comprising: a controller configured to determine, in a service zone, whether or not service information corresponding to a service zone is identical to service information previously used in the service zone, and provide control to display previously stored service information or updated service information based on the determination; and a display unit configured to visually display the previously stored service information or the updated service information under the control of the controller, wherein the controller controls the display unit to display the updated service information by updating the previously stored service information.

7 Claims, 5 Drawing Sheets

(56) References Cited

U.S. PATENT DOCUMENTS

| | | | |
|---|---|---|---|
| 8,634,349 B1 * | 1/2014 | Shmidt | H04W 4/08 370/328 |
| 8,787,188 B1 * | 7/2014 | Shmidt | H04W 4/08 370/252 |
| 2005/0107038 A1 * | 5/2005 | Coutts | 455/41.2 |
| 2007/0091861 A1 * | 4/2007 | Gupta | H04L 12/24 370/338 |
| 2007/0117585 A1 * | 5/2007 | Juneja et al. | 455/550.1 |
| 2007/0270165 A1 * | 11/2007 | Poosala | 455/456.3 |
| 2008/0130595 A1 * | 6/2008 | Abdel-Kader | 370/338 |
| 2008/0181187 A1 * | 7/2008 | Scott et al. | 370/338 |
| 2008/0214103 A1 * | 9/2008 | Nelson | H04M 1/22 455/3.06 |
| 2009/0111466 A1 * | 4/2009 | Montemurro et al. | 455/434 |
| 2009/0161639 A1 * | 6/2009 | Ostergren | 370/338 |
| 2009/0245184 A1 * | 10/2009 | Torres et al. | 370/329 |
| 2011/0300865 A1 * | 12/2011 | Kashikar et al. | 455/435.2 |

\* cited by examiner

APPARATUS AND METHOD FOR DISPLAYING SERVICE INFORMATION PROVIDED IN SERVICE ZONE

TECHNICAL FIELD

The present invention relates to an apparatus and method for displaying service information and, more particularly, to an apparatus and method for displaying service information provided in a particular service zone.

BACKGROUND ART

In general, when a service provided in a particular area is used, a user searches for his desired service among numerous services provided in a certain area and uses it. In particular, even when the certain area is an area in which the user has used a service or an area that the user has frequently visited, the user must directly search for his desired service information among numerous types of service information provided in the corresponding area. Thus, the use of service takes much time and is cumbersome in terms of user convenience.

DISCLOSURE OF THE INVENTION

Therefore, an object of the present invention is to extract customized service information from service information provided in a particular service zone and display it.

To achieve these and other advantages and in accordance with the purpose of the present invention, as embodied and broadly described herein, there is provided a terminal including: a controller configured to determine whether or not service information corresponding to a service zone is identical to service information previously used in the service zone, and provide control to display previously stored service information or updated service information based on the determination; and a display unit configured to visually display the previously stored service information or the updated service information under the control of the controller, wherein the controller controls the display unit to display the updated service information by updating the previously stored service information.

The terminal device may further include a storage unit, wherein the storage unit stores service information a user has previously used in the service zone.

When the service information corresponding to the service zone is identical to the service information previously used in the service zone, the controller controls the display unit to display preferentially the pre-stored service information.

When the service information corresponding to the service zone is different from the service information previously used in the service zone, the controller provides control to update the previously stored service information, and controls the display unit to display the updated service information.

The updated service information comprises service information which has been newly added or deleted in the previously stored service information, and the controller provides control to display the added or deleted service information such that they are discriminated from the pre-stored service information.

The controller controls the storage unit to store the updated service information.

When the terminal receives the service information corresponding to the service zone, the controller controls to extract the frequency of use of the service information from the storage unit and display the extracted service information in order starting from one having the highest frequency of use.

The service zone may indicate an area in which the terminal may connect to a server located in the service zone using a wireless communication scheme, and the server stores service information specialized for the service zone and provides the stored service information to terminals connected to the server.

The controller provides control to determine whether or not the service information corresponding to the service zone is identical to the service information previously used in the service zone by using a basic service area identifier of an access point corresponding to the service zone or location information of the terminal.

To achieve these and other advantages and in accordance with the purpose of the present invention, as embodied and broadly described herein, there is also provided a terminal device including: a controller configured to provide control to detect a signal strength of service information corresponding to a service zone, and to display the service information corresponding to the service zone based on the detected signal strength in the service zone; and a display unit configured to visually display the service information under the control of the controller.

The controller may control the display unit to display the service information in order starting from service information having the highest signal strength based on the detected signal strength, and to display an identifier indicating the service information based on the detected signal strength.

The terminal device may further include a global positioning system receiver configured to measure the location of the terminal, wherein when the detected signal strength is smaller than a pre-set threshold value, the controller provides control to drive the global positioning system receiver to measure the location of the terminal and controls the display unit to display a map including the location of the terminal.

The terminal device may further include: a wireless communication unit configured to transmit the measured location information of the terminal to an external server and receive location information of a service zone existing near the location of the terminal from the external server, wherein the external server may store location information of the service zone.

The controller may control the display unit to display the received location information of the service zone on the displayed map according to the form of the service zone.

According to exemplary embodiments of the present invention, customized service information is extracted from service information provided in a particular service zone by using user's history information or a signal strength, thus increasing a user convenience.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODES FOR CARRYING OUT THE PREFERRED EMBODIMENTS

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

The mobile terminal described in the present invention may include mobile phones, smart phones, notebook computers, digital broadcast receivers, PDAs (Personal Digital Assistants), PMPs (Portable Multimedia Player), navigation devices, and the like. It would be understood by a person in the art that the configuration according to the embodiments of the present invention can be also applicable to the fixed types of terminals such as digital TVs, desk top computers, or the like, except for any elements especially configured for a mobile purpose.

Figure 1:
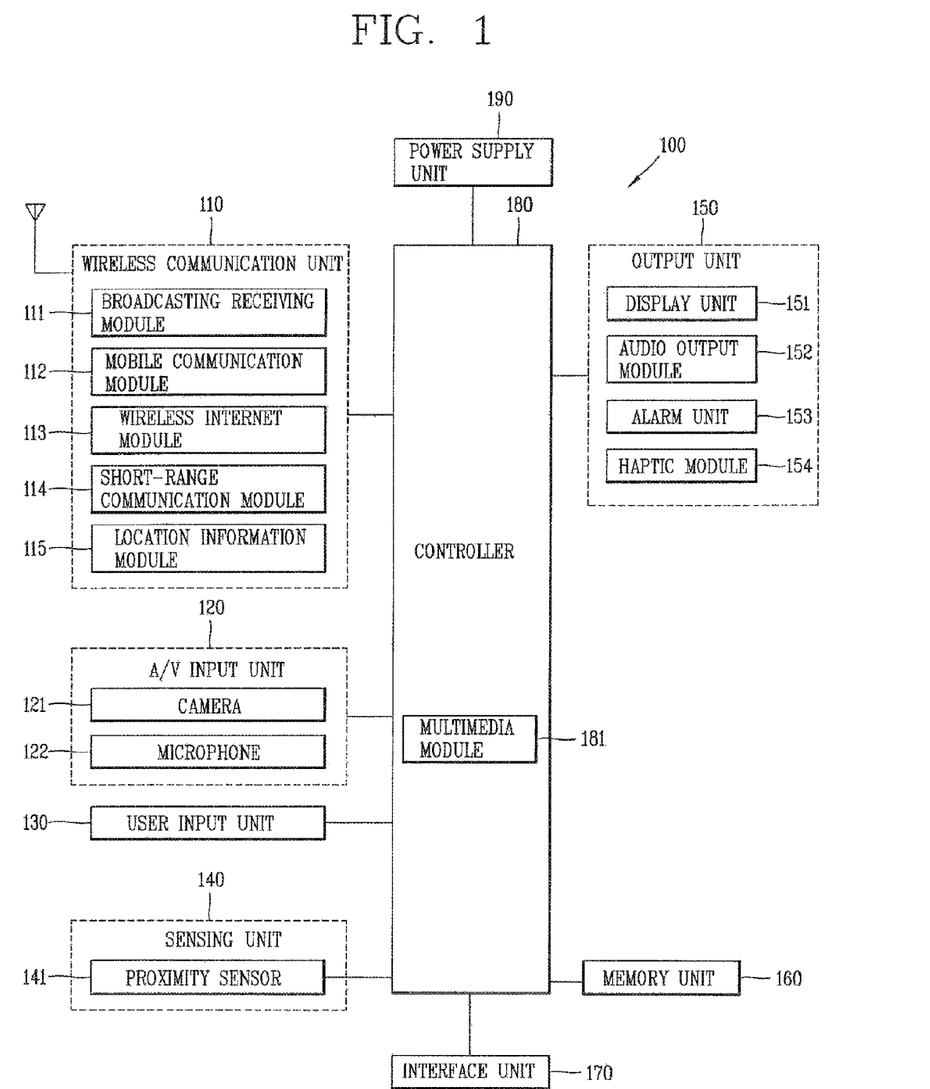
FIG. 1 is a schematic block diagram of a mobile terminal according to an exemplary embodiment of the present invention.

FIG. 1 is a block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or another type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System).

With reference to FIG. 1, the A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate input data from commands entered by a user to control various operations of the mobile terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units (or other display means) according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various types of information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Exemplary embodiments of the present invention related to a control method that can be implemented in the terminal configured as described above will now be described in detail. The exemplary embodiments described hereinafter may be used alone or may be combined to be used. The exemplary embodiments described hereinafter may be combined with the foregoing user interface so as to be used.

Concept of Zone Casting Service

First, a zone casting service refers to a service in which when a user who has entered a service zone executes a zone casting application (an application program), service information corresponding to the service zone is transmitted from a server located in the service zone. In particular, the zone casting service refers to a service of providing customized or specialized service information among the service information corresponding to the service zone. Here, the customized or specialized service information refers to tailored service information which is useful to or required by the user in a current service zone.

The service zone refers to an area in which a user is connected to a network established in a particular place or particular area to receive a service provided from a server within the network. For example, the service zone may be a particular place such as a department store, a theater, a hotel, and the like, or a particular area including the department store, the theater, and the hotel.

Here, a wired/wireless communication scheme may be used to be connected to the network. Also, short-range wireless communication scheme such as Wi-Fi, Bluetooth, NFC/RFID, or the like, may be employed as the wireless communication scheme, but the present invention is not limited thereto and a mobile communication scheme such as 3G, LTE (Long Term Evolution), WiMAX, or the like, may be also employed.

The service information refers to information, such as a service, a service list, contents with respect to the corresponding service, and the like, which can be provided in the service zone. Here, the service corresponding to the service zone may be represented or expressed in various manners such as icons, images, text, and the like.

The zone casting application refers to an application program for receiving the zone casting service, which can be available in any place of the service zone. Namely, the zone casting application refers to an application available in the service zone in which the zone casting service is provided.

Also, the zone casting application may be previously pre-stored or may be downloaded automatically or manually after a user enters the service zone. Here, the discrimination of automatic and manual operation means that the application program can be used without a user intervention.

System for Providing Zone Casting Service

Figure 2:
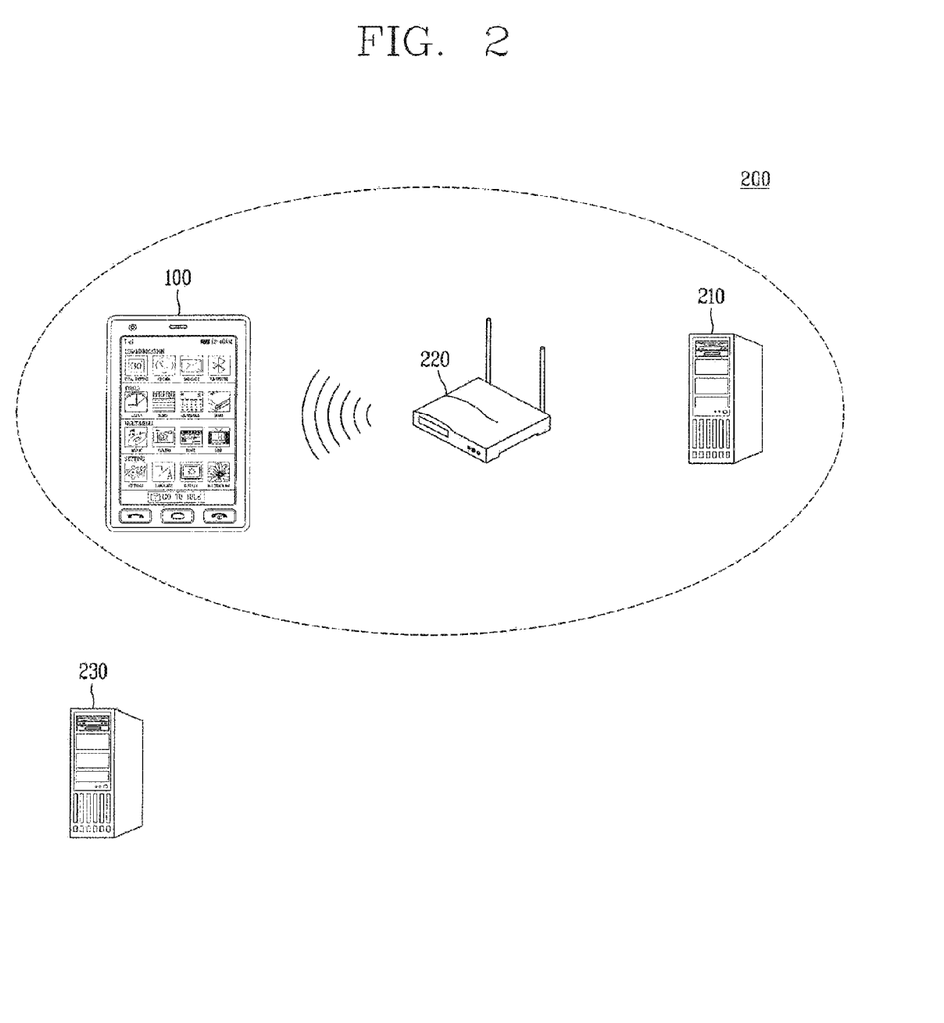
FIG. 2 is a conceptual view of providing a zone casting service according to an exemplary embodiment of the present invention.

FIG. 2 is a conceptual view of providing a zone casting service according to an exemplary embodiment of the present invention.

A system 200 providing the zone casting service may include the terminal 100, a local server 210, an access point 220, and an external server 230.

First, when the terminal detects that it has entered the service zone, the terminal may inform the user accordingly in various manners. For example, the terminal informs the user that the terminal is located in the specialized service area by using a SMS, a voice message, a vibration function, or by providing a screen fitting the service zone.

When request information of the user is input in order to receive the specialized service information, the terminal searches access points provided in the service zone and is connected to the local server of the service zone by using one of the searched access points. After being connected to the local server, the terminal receives the service information stored in the local server. Here, the method of inputting the user's request information may be a process selecting an application for accessing the specified service zone. The application is an application program that can be used anywhere in the specialized service zone.

The local server 210 is a server operated in a specialized service zone. The local server 210 stores customized contents specialized for each of particular service zones, and provides the stored service information to terminals connected to the local server.

The local server makes service information provided in the service zone database according to the characteristics or positions of the service information. Here, the information DB stored in the local server may be service information provided in a building or a particular area including the local server, which may be information regarding articles or goods, coupons, advertisements, or access points.

For example, when the specified service zone is a hotel, the local server may make a database of various types of service information provided in the hotel, and store the database(such as area information around the hotel, room service information, restaurant information located in the hotel).

The access point 220 is a wireless communication device allowing the terminal to access the local server. In the present exemplary embodiment, for example, the terminal is connected to the local server by using a Wi-Fi wireless access scheme, but the present invention is not meant to be limited thereto. For example, the terminal may access the local server through various communication schemes such as Bluetooth, NFC, a mobile communication network, an RFID scheme, and the like.

The external server 230 refers to a server that makes a database of location information of the specialized service zone and stores the same. The external server is generally located at an outer side of the specialized service zone to which the terminal is currently connected, but it may be located within the specialized service zone. In particular, when the terminal is located at an outer side of the specialized service zone, it may measure the location of a specialized service zone which is nearest from the current location of the terminal and transmit the measured location information through the GPS receiver to the external server, so that it can receive the location information of the specified service zone from the external server. In this case, in order to access the external server, the terminal may use various communication schemes such as a mobile communication network, and the like.

Figure 3:
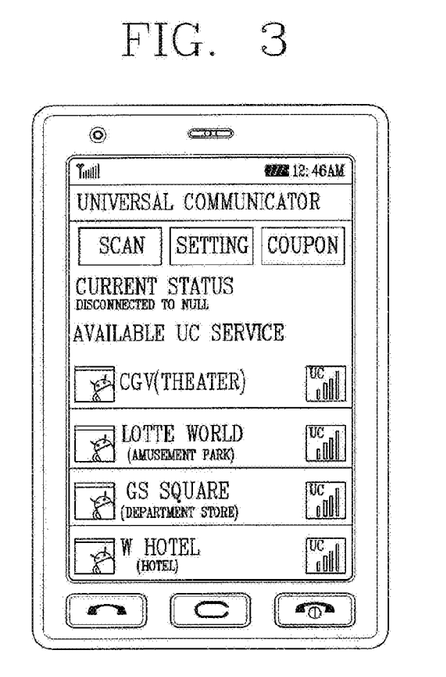
FIG. 3 is an overview of a display screen illustrating a function of preferentially displaying a service information list previously used in a specialized zone by using user's history information according to an exemplary embodiment of the present invention.

FIG. 3 is an overview of a display screen illustrating a function of preferentially displaying a service information list previously used in a specialized zone by using user's history information according to an exemplary embodiment of the present invention.

In order to perform such a function, the terminal is configured to include a controller 180 and a display unit 151.

First, when the terminal detects that it has entered a service zone, the controller 180 determines whether or not service information corresponding to the service zone is service information which has been previously used in the service zone. Based on the determination results, the controller 180 may control to display previously stored service information or update the pre-stored service information.

The display unit 151 visually displays the previously stored or the updated service information under the control of the controller 180.

In order to determine whether or not the service information corresponding to the service zone is service information which has been previously used in the service zone, first, the controller 180 detects a basic service set identifier (BSSID) of the AP provided in the current specialized service zone. The controller 180 then checks whether or not the detected BSSID is stored in a storage unit including user's history information.

Upon checking, when the detected BSSID of the AP is included in the storage unit, the controller 180 preferentially displays the service information stored in the storage unit.

In preferentially displaying the stored service information, the service information may be displayed at an upper portion than other service information displayed on the display unit, displayed to be larger than other service information displayed on the display unit, or displayed at a particular position of the display unit, for user's easy recognition.

Upon checking, when the detected BSSID of the AP is not stored in the storage unit, the controller 180 updates the previously stored service information and then displays a list of the updated service information.

While the previously stored service information is being updated, the controller 180 may inform the user that the previously stored service information is being updated using a message pop-up, in a text form, a voice message, an image indicating the update proceeding situation, or the like.

Second, when the terminal enters the specialized service zone, the controller 180 drives the GPS receiver for measuring a current location of the terminal. The controller 180 checks whether or not the location information, namely, location coordinate values, of the terminal measured from the GPS receiver is included in the storage unit which stores the user's history information.

Upon checking, when the location information of the terminal 180 is included in the storage unit, the controller 180 preferentially displays the list of service information, namely, customized service information, which has been previously used in the specialized service zone and stored in the storage unit.

Here, even when the location information, namely, the location coordinate values, of the terminal is not identical to the value stored in the storage unit but within a certain tolerance range, the controller 180 determines the same area and preferentially displays the customized service information.

Here, the specialized service zone as mentioned above refers to an area a user is available for a service by using the Wi-Fi wireless communication scheme. Namely, the specialized service zone refers to an area in which the local server operated in the service zone provides service information stored in the local server to terminals connected to the local server.

Figure 4:
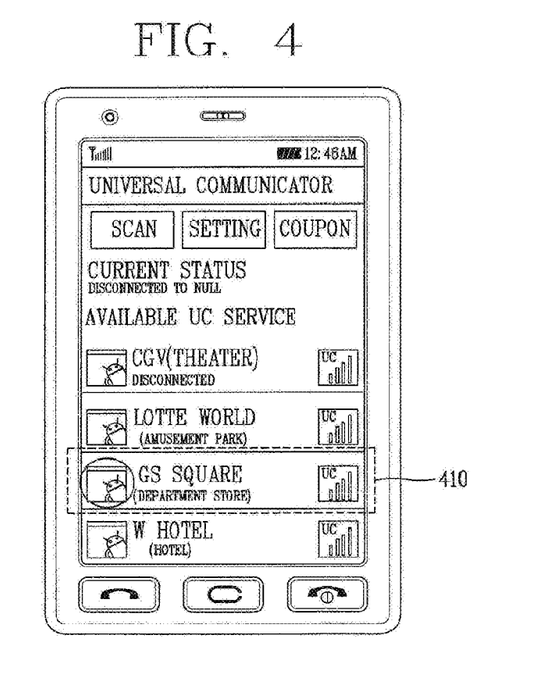
FIG. 4 is an overview of a display screen illustrating a function of displaying a matter having a newly added service information in the list of service information previously used in the specialized service zone according to an exemplary embodiment of the present invention.
Figure 5:
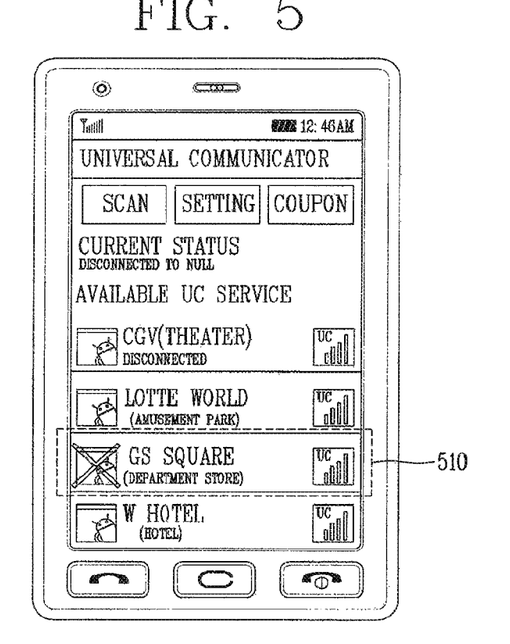
FIG. 5 is an overview of a display screen illustrating a function of displaying a matter of deleted service information on the list of service information previously used in the specialized service zone according to an exemplary embodiment of the present invention.

FIGS. 4 and 5 show the function of displaying information reflecting updated matters in the list of service information previously used in the specialized service zone according to an exemplary embodiment of the present invention.

Specifically, FIG. 4 shows the case in which new service information is added, and FIG. 5 shows a case in which service information is deleted.

The controller 180 compares the service information corresponding to the specialized service zone with previously stored service information, and reflects the updated service information in the previously stored service information.

The updated service information may be service information which is newly added (410) or deleted (510) in the previously stored service information, and the controller provides control to discriminately display the updated service information.

When service information is newly added to the previously stored service information, the size of the newly added information may be increased for a certain period of time, and the size of the deleted service information may be reduced for a certain period of time, so that the newly added or deleted service information can be generated on the display unit or disappear automatically or according to a user selection after the lapse of a certain time.

Also, the controller controls the storage unit to store the service information reflecting the updated service information. Namely, the list of the finally updated service information is stored in the storage unit.

Also, for example, in case in which the service information received by the terminal in the specialized service zone is an AP, when the AP is the same but only a service set identifier (SSID) of the AP has been changed, the service information is updated with the changed SSID and displayed.

Figure 6:
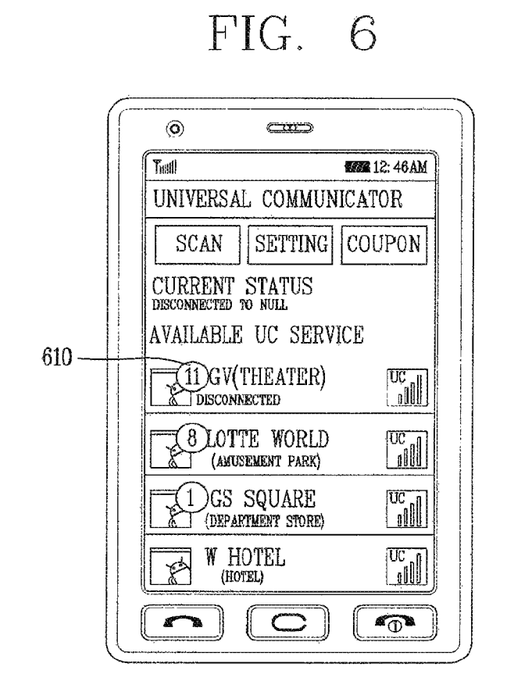
FIG. 6 is an overview of a display screen illustrating a function of displaying the frequency of use of each repeatedly used service information according to an exemplary embodiment of the present invention.

FIG. 6 is an overview of a display screen illustrating a function of displaying the frequency of use of each repeatedly used service information according to an exemplary embodiment of the present invention.

Upon receiving the service information corresponding to the specialized service zone, the controller 180 extracts the frequency of use 610 corresponding to the service information from the storage unit. The controller 180 displays the extracted frequency of use on each service information and, in this case, the controller 180 provides control to display the service information starting from the on having the highest frequency of use.

For example, as shown in FIG. 6, when the service information corresponding to the specialized service zone is an AP, the controller receives the AP and extracts the number of connections of the AP from the storage unit. The controller provides control to display the extracted connection number starting from the largest number of connections to the AP.

Figure 7:
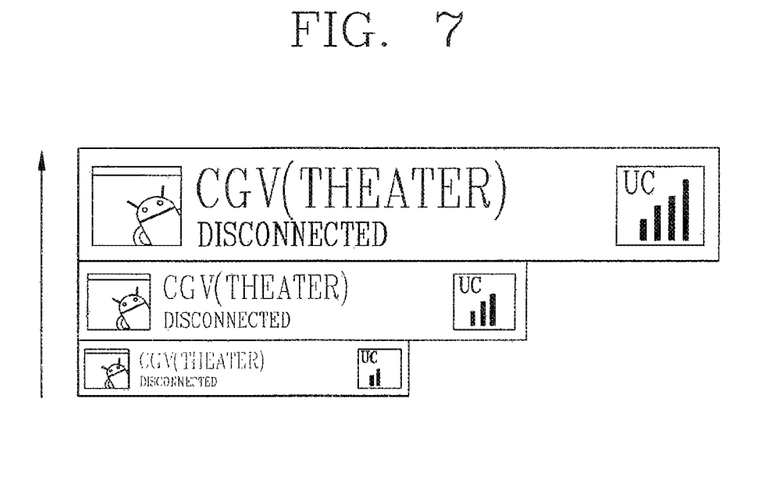
FIG. 7 is a view illustrating a function of displaying service information provided in the specialized service zone according to a signal strength according to an exemplary embodiment of the present invention.

FIG. 7 is a view illustrating a function of displaying service information provided in the specialized service zone according to a signal strength according to an exemplary embodiment of the present invention.

In order to perform such a function, the terminal may be configured to include a controller and a display unit.

After a user enters the specialized service zone, the controller 180 detects a signal strength of service information corresponding to the specialized service zone, compares the detected signal strength with a pre-set threshold value, and displays a list of service information corresponding to those having a signal strength greater than the threshold value on the basis of the comparison results.

The foregoing pre-set threshold value may be a value previously set by the user or a value set in the specialized service zone when the user enters the specialized service zone. The threshold value may be different or the same for each specialized service zone.

According to the comparison results, when the detected signal strength is greater than the threshold value, the controller may provide control to display the service information starting from the one having the highest signal strength or display identifiers indicating service information according to the signal strength. Here, the identifiers representing the service information may be the name, an icon, or a symbol of the service information.

For example, as shown in FIG. 7, after the signal strength of each of the APs corresponding to the specialized service zone, when the detected signal strengths are greater than the pre-set threshold value, the APs may be displayed in order starting from one having the highest signal strength, or the SSIDs of the APs are displayed according to the signal strength.

The display unit 151 visually displays the service information under the control of the controller.

Figure 8:
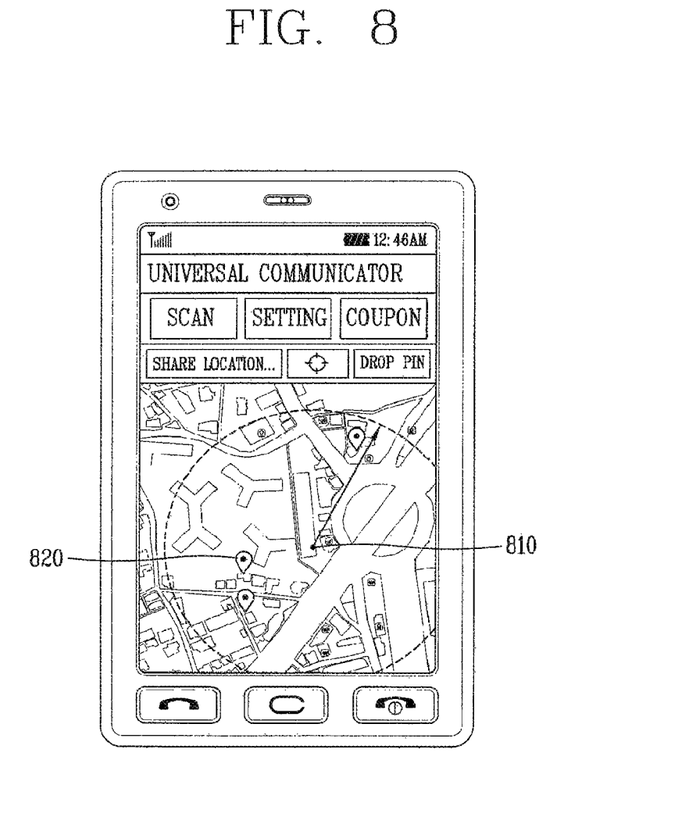
FIG. 8 is an overview of a display screen illustrating a function of displaying location information of a specialized service zone located near a terminal along with the location of the terminal on a map according to an exemplary embodiment of the present invention.

FIG. 8 is an overview of a display screen illustrating a function of displaying location information of a specialized service zone located near a terminal along with the location of the terminal on a map according to an exemplary embodiment of the present invention.

The controller 180 detects a signal strength of service information corresponding to the specialized service zone. When the detected signal strength is smaller than the pre-set threshold value, the controller drives the GPS receiver to measure a location 810 of the terminal and controls the display unit to display a map including the location of the terminal.

Also, the measured location information of the terminal is transmitted to an external server by the wireless communication unit, and location information 820 of the specialized service zone located near the terminal is received from the external server. Here, the external server refers to a server storing the location information of the specialized service zone.

The controller 180 controls the display unit to display the location information of the specialized service zone received from the external server, in the form of service types on the map displayed on the display unit.

As shown in FIG. 8, the location information of the specialized service zone transmitted from the external server is displayed together with the location of the terminal on the map.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A terminal comprising:
   a wireless communication unit;
   a storage unit configured to store at least one information related to access points previously used by the terminal;
   a display; and
   a controller configured to:
      extract a number of connections of the access points from the storage unit;
      control the display to display a first list comprising the at least one information related to access points that were previously used by the terminal;
      search at least one access point which is able to communicate with the wireless communication unit where the terminal is positioned in a state that the first list is displayed on the display, wherein while the at least one access point is being searched, a graphic object indicating that the at least one access point is being searched is displayed on the display together with the first list; and
      control the display to display a second list different from the first list when the searched at least one access point is different from the access points previously used by the terminal,
   wherein the extracted number of connections of the access points is displayed on the display together with the at least one information related to the access points, and
   wherein the second list includes information related to the searched at least one access point and the information related to the access points previously used including at least one available access point that was previously used and at least one non-available access point that was previously used where the terminal is positioned.

2. The terminal of claim 1, wherein the controller controls the display to display the first list when the searched at least one access point is identical to one of the access points previously used.

3. The terminal of claim 1, wherein the second list comprises the information related to the searched at least one access point which has been newly added in the information related to the access points previously used, and
   wherein the controller controls the display to display the added information such that the information related to the searched at least one access point is discriminated from the information related to the access points previously used.

4. The terminal of claim 1, wherein the controller controls the storage unit to store the information related to the searched at least one access point.

5. The terminal of claim 4, wherein the controller extracts a frequency of use of the information related to the searched at least one access point from the storage unit and display the extracted information related to the searched at least one of access point in an order starting from an access point having a highest frequency of use when the terminal searches the at least one access point.

6. The terminal of claim 1, wherein the server stores service information specialized for a service zone and provides the stored service information to terminals connected to the server when the terminal is located in the service zone which is an area in which the terminal may connect to a server located in the service zone through the wireless communication unit.

7. The terminal of claim 1, wherein the controller determines whether or not the searched at least one access point is identical to one of the access points previously used by using a basic service set identifier of the searched at least one access point or location information of the terminal.

* * * * *